(12) United States Patent
Mason

(10) Patent No.: US 11,787,455 B1
(45) Date of Patent: *Oct. 17, 2023

(54) POSITIVE TRAIN CONTROL SIMULATION SYSTEM WITH PENALTY APPLICATION AND METHOD THEREFOR

(71) Applicant: BNSF Railway Company, Fort Worth, TX (US)

(72) Inventor: Nicholas Glen Mason, Garden City, MO (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,512

(22) Filed: Mar. 18, 2022

Related U.S. Application Data

(63) Continuation-in-part of application No. 17/698,321, filed on Mar. 18, 2022.

(51) Int. Cl.
*B61L 27/60* (2022.01)
*B61L 27/20* (2022.01)
(Continued)

(52) U.S. Cl.
CPC ............ *B61L 27/60* (2022.01); *B60T 15/027* (2013.01); *B60T 17/18* (2013.01); *B61L 27/20* (2022.01); *G09B 9/04* (2013.01)

(58) Field of Classification Search
CPC .......... B61L 27/60; B61L 27/20; B61L 23/24; B60T 15/027; B60T 17/18; G09B 9/04
See application file for complete search history.

(56) References Cited

U.S. PATENT DOCUMENTS 4,041,283 A * 8/1977 Mosier .................... G09B 9/04
246/167 R
5,618,179 A * 4/1997 Copperman .......... A63F 13/803
434/69
(Continued)

FOREIGN PATENT DOCUMENTS

CN 205750519 U 11/2016
CN 208506591 U 2/2019

OTHER PUBLICATIONS

Canadian Patent No. CA 3021280-A1 dated Apr. 19, 2019 to Ferrell et al.*

(Continued)

*Primary Examiner* — Pamela Rodriguez
(74) *Attorney, Agent, or Firm* — Enrique Sanchez, Jr.; Whitaker Chalk Swindle & Schwartz PLLC

(57) ABSTRACT

A system and method for simulating positive train control (PTC) systems in a local and controlled environment using software and hardware. The system can simulate various functionalities of the PTC system in the environment using software and hardware components. The system can instruct the software of a train management computer (TMC) to control electromechanical valves to simulate air compression on brake pipes in response to the PTC system executing a penalty on the locomotive. The system can display statuses of various systems on the locomotive to a user using a cab display unit (CDU). The system can control the software and hardware components to simulate warnings and actions from the PTC system allowing locomotive engineers and conductors to experience the PTC system for optimum training.

8 Claims, 9 Drawing Sheets

(51) Int. Cl.
  *B60T 15/02* (2006.01)
  *B60T 17/18* (2006.01)
  *G09B 9/04* (2006.01)

(56) References Cited

U.S. PATENT DOCUMENTS

| | | | | |
|---|---|---|---|---|
| 5,967,620 | A * | 10/1999 | Truglio | B60T 13/665 |
| | | | | 303/3 |
| 6,325,464 | B2 * | 12/2001 | Truglio | B60T 13/665 |
| | | | | 303/7 |
| 6,457,782 | B1 * | 10/2002 | Truglio | B60T 13/665 |
| | | | | 303/7 |
| 8,398,405 | B2 * | 3/2013 | Kumar | G09B 9/06 |
| | | | | 434/66 |
| 9,283,945 | B1 | 3/2016 | Kernwein et al. | |
| 9,828,013 | B2 | 11/2017 | Shubs, Jr. et al. | |
| 9,873,443 | B2 | 1/2018 | Sleasman et al. | |
| 10,173,703 | B2 | 1/2019 | Wait et al. | |
| 2019/0120724 | A1 | 4/2019 | Ferrell et al. | |
| 2020/0156678 | A1 | 5/2020 | Moss | |
| 2020/0189635 | A1 | 6/2020 | Hurst | |

OTHER PUBLICATIONS

U.S. Department of Transportation, PTC Test Bed Siding Signal Upgrade at the Transportation Technology Center, May 31, 2018.
Weinstein, Margery, BNSF Railway Is on Board with Topnotch Training, Feb. 28, 2018.
PST, PTC—Postive Train Control Training and Simulation to Help Meet FRA Railroad Training Requirements, Aug. 3, 2020.
Princeton Consultants, SATS: An advanced signal design system and simulation tool, Dec. 31, 2019.
Wabtec, TMDS, Aug. 3, 2020.

\* cited by examiner

POSITIVE TRAIN CONTROL SIMULATION SYSTEM WITH PENALTY APPLICATION AND METHOD THEREFOR

CROSS-REFERENCE TO RELATED APPLICATIONS

The present application is a Continuation-in-Part of U.S. patent application Ser. No. 17/698,321, filed Mar. 18, 2022, the entirety of which is hereby incorporated by reference for all purposes.

TECHNICAL FIELD

The present disclosure relates generally to a simulation of locomotive penalty enforcement event, and more specifically to systems and methods for simulating physical and electrical characteristics corresponding to Positive Train Control penalty enforcement events.

BACKGROUND

Positive Train Control (PTC) systems use communication-based and processor-based train control technology to reliably and functionally prevent train-to-train collisions, over-speed derailments, incursions into established work zones, and movements of trains through switches left in the wrong position. PTC systems harmonize interoperability between electrical and mechanical systems to act in moments when a locomotive disregards a safety plan. For example, the PTC system operates in response to identifying speed of the locomotive is greater than the route speed allows enabling a penalty to the locomotive by applying the brakes. The Federal Railroad Administration mandates PTC systems operating on every mile of railroad meaning every locomotive on the railroad includes a PTC system.

Teaching how a PTC system operates on a locomotive currently lacks any ability to simulate the system components. While training on a locomotive with the PTC system is ideal, this is unlikely because of the inability for a trainer to obtain the locomotive for the time to properly train the upcoming engineers and conductors. Training engineers and conductors can take weeks, months, even years, so removing a locomotive from use can create dissatisfactory efficiency. Additionally, because trainees focusing on becoming an engineer or a conductor cannot practice in a practical environment, the trainees receive insufficient training. Engineers and conductors without proper training with the PTC system can frequently trigger the PTC system on the locomotive by traveling with unsafe locomotive handling. While the PTC system ensures for enhanced safety the risk continues for train derailments and train-to-train collisions.

SUMMARY

The present disclosure achieves technical advantages as a system and method for simulating PTC systems in a local environment using software and hardware, removing the training program from using an actual locomotive. The system can simulate various functionalities of the PTC system in a classroom environment using software and hardware components. For example, the system can couple the software of a train management computer (TMC) to electromechanical valves to simulate air compression on brake pipes in response to the PTC system executing a penalty on the locomotive. The system can display statuses of various systems on the locomotive to a user using a cab display unit (CDU). For example, the TMC enables the hardware and software of the system to communicate information relevant to analyzing warnings from the PTC system. The system can control the software and hardware components to simulate warnings and actions from the PTC system allowing trainees to experience the PTC system for optimum training.

The present disclosure solves the technological problems of providing insufficient training for interacting with the PTC system and restricting trainees from experiencing the PTC system in action by simulating warnings and actions from the PTC system using stand-alone system components, which removes the locomotive from at least some of the training program. By removing the locomotive from at least some of the training program yields flexibility to the instructors while optimizing education for the trainees. Additionally, removing the locomotive from some of the training saves time for the training program while enabling immediate feedback to handling the locomotive in response to the PTC system warnings. Separating at least the initial PTC training for the novice engineers and conductors from operating on locomotives also minimizes liability and risk, such as breaking components on the locomotive and potentially causing a hazardous safety environment.

The present disclosure provides a technical solution to the technical problem by providing software and hardware components for instructional purposes. Particularly, the present disclosure focuses on optimizing training conditions for interacting with the PTC system. In a real-world environment, the PTC system can transmit warnings and instructions to the locomotive instructing it how to respond to certain situations. The present disclosure provides control mechanisms interacting between software and hardware components to simulate a locomotive environment. The simulated locomotive environment enables a user to practice interacting with the PTC system without physical repercussions, such as the PTC system applying the brakes to the locomotive. The present disclosure enables users to interact with locomotive components in a system coupling components corresponding to the PTC system in a classroom environment.

It is an object of the invention to provide a system for simulating a penalty condition in a PTC. It is a further object of the invention to provide a system for simulating a penalty application from a PTC. These and other objects are provided by at least the following embodiments.

In an embodiment, a method for simulating a penalty condition in a PTC system, comprising: receiving an instruction corresponding to a train penalty condition; supplying compressed air to one or more pressure transducers at a first pressure for a penalty period; and converting the first pressure to a second pressure at a penalty rate to simulate the train penalty condition. Wherein the first pressure can be 90 pounds per square inch (psi), and wherein the second pressure can be 58 psi. Wherein the penalty rate is based on a service rate. Wherein the method further comprising energizing a pulse conversion relay, a penalty magnetic valve, an interval delay relay, and a vent magnetic valve. Wherein the pressure transducers include an equalizer reservoir pressure transducer and a brake pipe pressure transducer. Wherein the method further comprising activating the equalizer reservoir pressure transducer and the brake pipe pressure transducer. Wherein the method further comprising deenergizing the pulse conversion relay to supply a first voltage to the interval delay relay. Wherein the method further comprising providing a second voltage from the interval delay relay to the vent magnetic valve for a time duration. Wherein the first voltage and the second voltage can be 74 volts. Wherein further comprising deenergizing the penalty magnetic valve to initialize the second pressure.

In another embodiment, a system for simulating a penalty condition in a PTC system, comprising: an internal delay relay operably coupled to a PTC terminal board; a pulse conversion relay operably coupled to the internal delay relay and the PTC terminal board; an air compressor operably coupled to the pulse conversion relay; a penalty magnetic valve operably coupled to the air compressor; at least one brake pipe pressure transducer operably coupled to the penalty magnetic valve; a brake cylinder pressure transducer operably coupled to the penalty magnetic valve; a vent magnetic valve operably coupled to the penalty magnetic valve and the internal delay relay; wherein the system controls compressed air applied to the at least one brake pipe pressure transducer and the brake cylinder pressure transducer. Wherein the system further comprises: an equalizing reservoir pressure transducer operably coupled to the penalty magnetic valve; and a reservoir operably coupled to the penalty magnetic valve and the emergency magnetic valve. Wherein the penalty magnetic valve provides compressed air to the equalizer reservoir and the at least one brake pipe. Wherein the compressed air can be 90 psi when the penalty magnetic valve is active, and wherein the compressed air can be 58 psi when the penalty magnetic valve is inactive. Wherein the vent magnetic valve includes a choke. Wherein the emergency magnetic valve includes an exhaust. Wherein the air compressor provides compressed air to the brake cylinder. Wherein the compressed air can be 72 psi.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
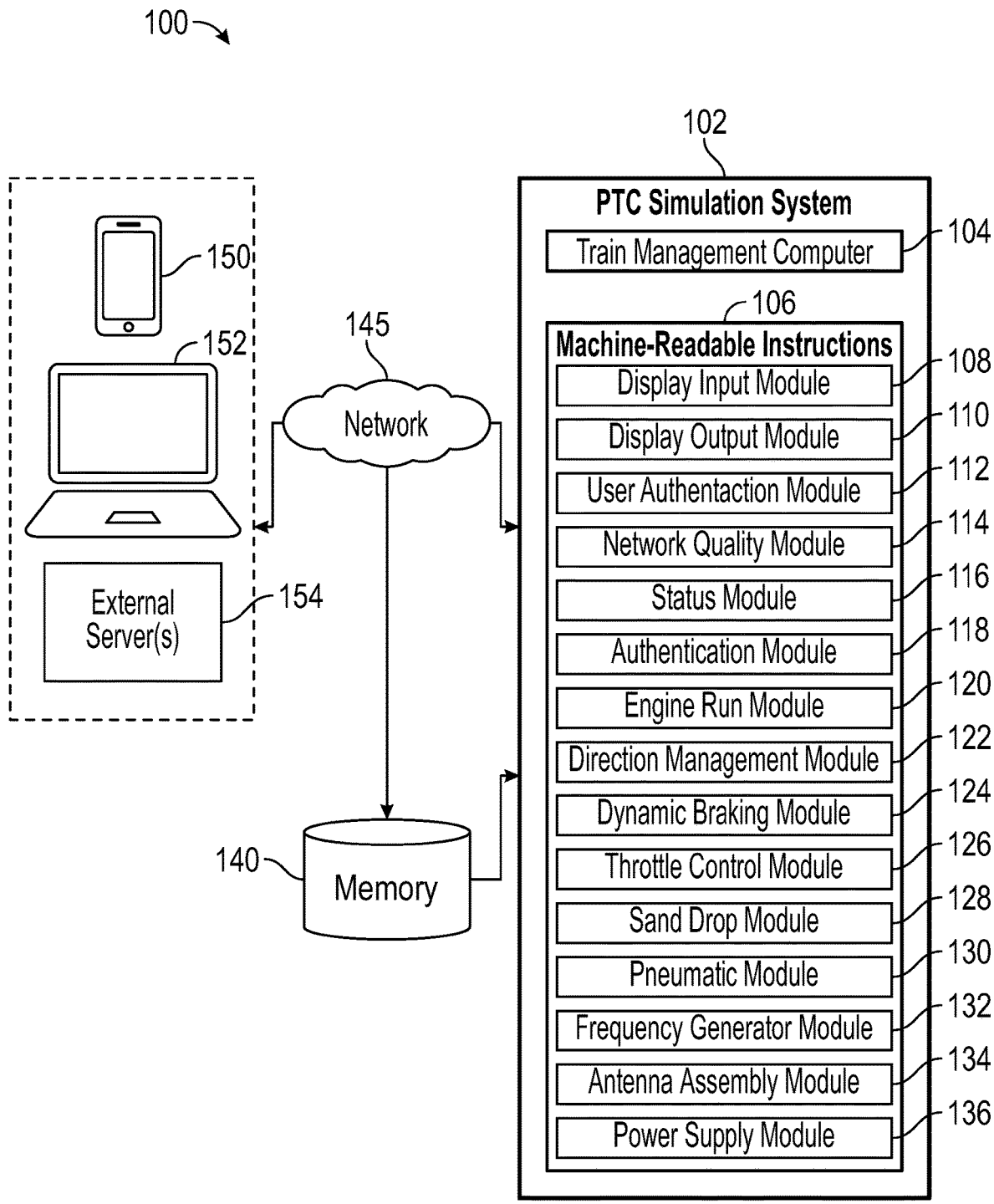
FIG. 1 illustrates a simulation environment, in accordance with one or more embodiments of the present disclosure.

FIG. 1 illustrates a schematic view of a simulation environment 100, in accordance with one or more embodiments of the present disclosure. The simulation environment 100 can include a simulation system 102, a train management computer (TMC) 104, machine-readable instructions 106, including a display input module 108, display output module 110, user authentication module 112, network quality module 114, status module 116, authentication module 118, engine run module 120, direction management module 122, dynamic braking module 124, throttle control module 126, sand drop module 128, pneumatic module 130, frequency generator module 132, antenna assembly module 134, and power supply module 136, among other relevant modules. The Simulation system 102 can be operably coupled to one or more clients via a network 145. The clients can be a physical device (e.g., mobile phone 150, laptop 152, external server(s) 154, desktop computer, wearable device, or other suitable device), program, or application. In another embodiment, a client can include an external server 154 having an application configured to communicate with the Simulation system 102 over the network 145.

The aforementioned system components (e.g., Simulation system 102 and client(s) 150, 152, 154, etc.) can be communicably coupled to each other via the network 145, such that data can be transmitted. The network 145 can be the Internet, intranet, or other suitable network. The data transmission can be encrypted, unencrypted, over a virtual private network (VPN) tunnel, or other suitable communication means. The network 145 can be a wide area network (WAN), local area network (LAN), personal area network (PAN), or other suitable network type. The network communication between the clients, the Simulation system 102, or any other system component can be encrypted using pretty good privacy (PGP), Blowfish, Twofish, triple data encryption standard (3DES), hypertext transfer protocol secure (HTTPS), or other suitable encryption. The simulation environment 100 can be configured to provide communication via the various systems, components, and modules disclosed herein via an application programming interface (API), peripheral component interface (PCI), PCI-Express, American National Standards Institute (ANSI)-X12, Ethernet, Wi- Fi, Bluetooth, or other suitable communication protocol or medium. Additionally, third party systems and databases can be operably coupled to the system components via the network 145.

The data transmitted to and from the components of simulation environment 100 (e.g., the Simulation system 102 and clients), can include any format, including JavaScript Object Notation (JSON), transfer control protocol (TCP)/internet protocol (IP), extensible markup language (XML), hypertext markup language (HTML), American Standard Code for Information Interchange (ASCII), short message service (SMS), comma-separated value (CSV), representational state transfer (REST), or other suitable format. The data transmission can include a message, flag, header, header properties, metadata, and/or a body, or be encapsulated and packetized by any suitable format having same.

The Simulation system 102 can be implemented in hardware, software, or a suitable combination of hardware and software therefor, and may comprise one or more software systems operating on one or more servers, having the TMC 104, with access to memory 140. The Simulation system 102 can include electronic storage, one or more processors, and/or other components. The Simulation system 102 can include communication lines, connections, and/or ports to enable the exchange of information via a network 145 and/or other computing platforms. The Simulation system 102 can also include a plurality of hardware, software, and/or firmware components operating together to provide the functionality attributed herein to the Simulation system 102. For example, the Simulation system 102 can be implemented by a cloud of computing platforms operating together as the Simulation system 102, including Software-as-a-Service (SaaS) and Platform-as-a-Service (PaaS) functionality. Additionally, the Simulation system 102 can include memory 140.

The memory 140 can comprise electronic storage that can include non-transitory storage media that electronically stores information. The electronic storage media of electronic storage can include one or both of system storage that can be provided integrally (e.g., substantially non-removable) with the Simulation system 102 and/or removable storage that can be removably connectable to the Simulation system 102 via, for example, a port (e.g., a Universal Serial Bus (USB) port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 145.

The TMC 104 can be configured to provide data processing capabilities in the Simulation system 102. As such, the TMC 104 can include one or more of a digital processor, an analog processor, a digital circuit designed to process information, an analog circuit designed to process information, a state machine, and/or other mechanisms for electronically processing information, such as field programmable gate arrays (FPGAs) or application specific integrated circuits (ASICs). The TMC 104 can be a single entity or include a plurality of processing units. These processing units can be physically located within the same device, or the TMC 104 can represent processing functionality of a plurality of devices or software functionality operating alone, or in concert.

The TMC 104 can be configured to execute machine-readable instructions 106 or machine learning modules via software, hardware, firmware, some combination of software, hardware, and/or firmware, and/or other mechanisms for configuring processing capabilities on the TMC 104. As used herein, the term "machine-readable instructions" can refer to any component or set of components that perform the functionality attributed to the machine-readable instructions 106. This can include one or more physical processors during execution of processor-readable instructions, the processor-readable instructions, circuitry, hardware, storage media, or any other components.

The simulation system 102 can be configured with machine-readable instructions 106 having one or more functional modules. The machine-readable instructions 106 can be implemented on one or more Simulation system 102, having the TMCs 110, with access to memory 140. The machine-readable instructions 106 can include control logic for implementing various functionality, as described in more detail below. The machine-readable instructions 106 can include certain functionality associated with the simulation environment 100. Additionally, the machine-readable instructions 106 can include a smart contract or multi-signature contract that can process, read, and write data to the database, distributed ledger, or blockchain.

Figure 2:
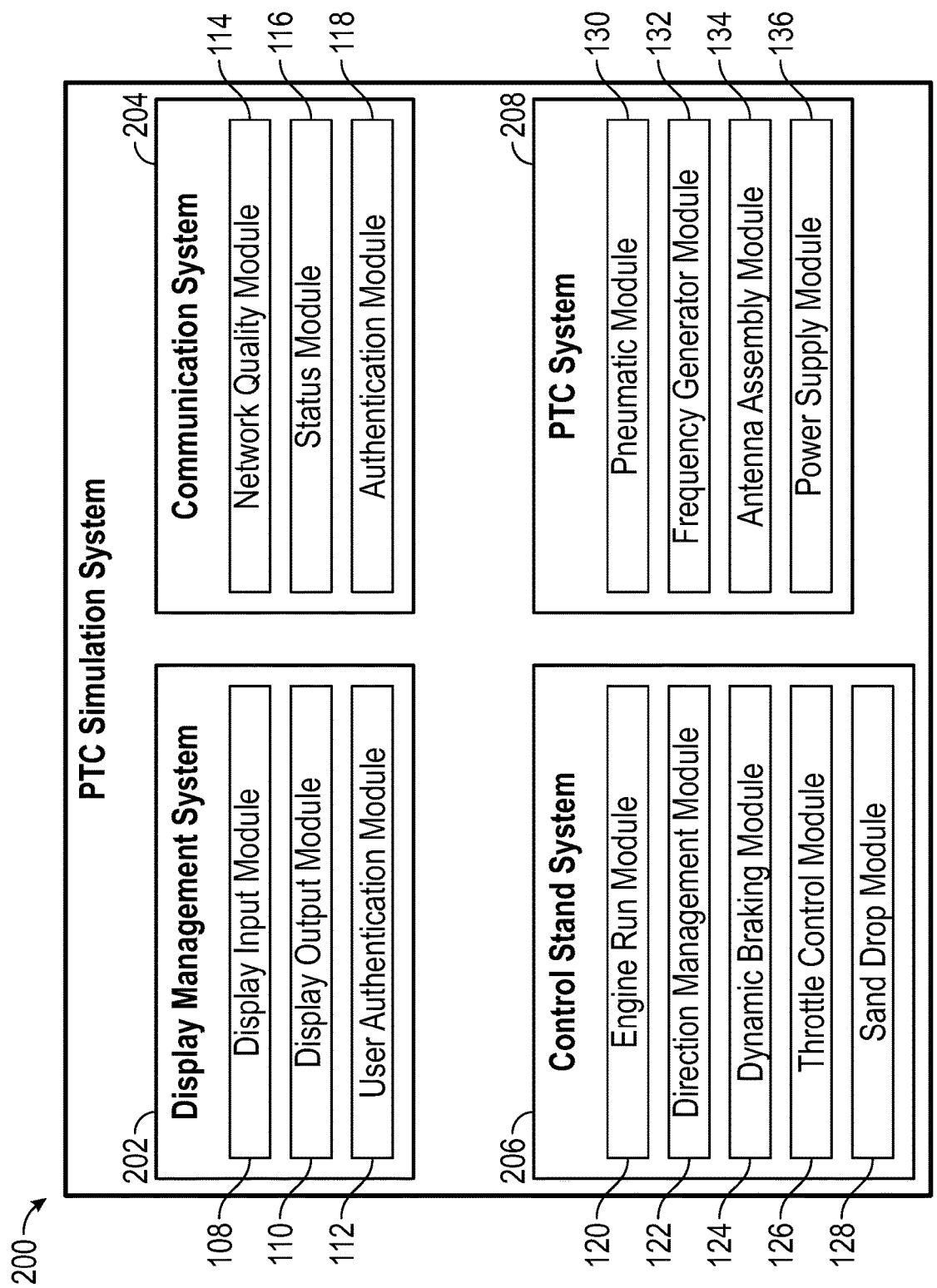
FIG. 2 illustrates a block diagram of a PTC simulation system, in accordance with one or more embodiments of the present disclosure.

FIG. 2 illustrates a schematic view of a PTC simulation system 200, in accordance with one or more embodiments of the present disclosure. The PTC simulation system 200 can include a display management system 202, a communication system 204, a locomotive control stand system 206, and a PTC system 208. Although certain embodiments may be directed towards simulating a penalty system, an emergency system, and a horn system of a PTC system, the PTC simulation system 200 can be used to simulate various other railroad system components for optimum training.

In one embodiment, the display management system 202 can include the display input module 108, the display output module 110, and the user authentication module 112. The display input module 108, the display output module 110, and the user authentication module 112 can implement one or more algorithms to facilitate retrieval and delivery of instructions, including status, selection, and authentication algorithms. The algorithms and their associated thresholds and/or signatures can be programmable to suit a particular event, application, function, facility, or other requirement. The display management system 202 can be configured to retrieve and modify instructions related to one or more simulation events or other suitable activity, to and from a user, a client, or a server. In another embodiment, the display management system 202 can generate one or more elements for display on the user device. The elements can provide additional information related to the status of PTC simulation management. For example, notifications can be generated by the display management system 202 and displayed on the display or the client to indicate simulated locomotive parameters including engine running, direction of travel, dynamic braking enabled, throttle level, antenna assembly enabled, wheel speed and stability, or other suitable information. Additionally, system symbols can be displayed on the client to indicate task, inspection, or analysis status.

The display input module 108 can receive inputs from a trainee, the TMC 104, and the antenna assembly 328. For example, the inputs can include the display input module 108 receiving instructions from the trainee indicating a query for more information. In an example, the actions the trainee will take can include pressing a button on the display 302 corresponding to a select function by the display input module 108. For example, the trainee can select a sensor output on the display 302 by pressing a button corresponding to the sensor output, which executes the select function command by the display input module 108. In another example, the display 302 can display various simulated and/or real sensor readings, which the trainee can select. In an example, the instructions from the trainee can include at least one button pressed, a touchscreen maneuver, a scroll and click method, or some other common display methods. In another example, the display input module 108 can receive incoming messages regarding railroad event notifications. For example, the railroad event notification can include PTC enforcement events, such as a penalty, an emergency, or a horn event. In another example, the display input module 108 can receive wireless communication signal strength notifications from the antenna assembly 328. For example, the antenna assembly 328 can transmit a notification of the signal strength of at least one wireless communication method to the display 302, and in turn, the display input module 108 can receive the notification and display corresponding symbols and values according to the notification.

The display output module 110 can transmit outputs to a trainee, the TMC 104, and the antenna assembly 328. For example, the outputs can include the display output module 110 transmitting instructions from the trainee indicating a query for more information. In an example, the actions the trainee will take can include pressing a button on the display 302 corresponding to a select function, which is transmitted to the TMC 104 for execution. For example, the trainee can select a sensor output on the display 302 by pressing a button corresponding to the sensor output, which transmits the select function instruction by the display output module 110 to the TMC 104. In another example, the display output module 110 can transmit wireless communication signal connection notifications to the antenna assembly 328. For example, the display output module 110 can transmit the notification for terminating a wireless communication method to the antenna assembly 328.

The user authentication module 112 can generate an authentication token for a particular trainee, instructor, user, session, or request. In another embodiment, the display input module 108 can access the network 145 without user credentials. In another embodiment, the display input module 108 can generate an authentication token using user data stored in the client. For example, a user can access a client and/or the PTC simulation system 200 by providing valid credentials via a login page or screen, including a username and password, biometrics, multi-factor authentication, or other suitable credential, such credentials, along with a user's information such as name, username, employee number, etc., can be stored in the client or server. In another embodiment, the display input module 108 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology.

In another embodiment, the authentication token can allow for single sign-on authentication to the server and/or memory from the client. In another embodiment, the display input module 108 can operate without a user interface. In another example, the display input module 108 can provide a user interface for a user to access the display input module 108. The automated workflow system 200 can utilize the display input module 108 to provide a user interface for receiving relevant data.

In one embodiment, the communication system 204 can include network quality module 114, status module 116, and authentication module 118. The include network quality module 114, status module 116, and authentication module 118 can implement one or more algorithms to facilitate status monitoring of warnings from the PTC system simulation, including a penalty, emergency, and horn enable algorithm. The algorithms and their associated thresholds and/or signatures can be programmable to suit a PTC event simulation system, application, function, facility, or other requirement. The communication system 204 can be configured to transmit and receive messages related to status monitoring or other suitable activity, to and from the client or server. In another embodiment, the communication system 204 can generate one or more elements for display on the client. The elements can provide additional information related to network connection quality. For example, a notification can be generated by the communication system 204 and displayed on the client to indicate a status update, network connection status, user access login information, or other suitable information. Additionally, system symbols can be displayed on the client to indicate management status.

In one embodiment, the network quality module 114 can query a client coupled to the PTC simulation system 200 regarding a network quality. For example, the network quality module 114 can detect a strength of a wireless or wired communication signal between the PTC simulation system 200 and a corresponding network, such as the network 145. In another example, the network quality module 114 can detect available networks for the PTC simulation system 200 to connect. For example, the network quality module 114 can identify network characteristics and whether the network characteristics are suitable for the PTC simulation system 200. In an example, the network quality module 114 can compare a preferred network by the PTC simulation system 200 to the network 145 and determine whether the network 145 is suitable as the preferred network. For example, the PTC simulation system 200 can transmit and receive information in an internet protocol (IP) version 6 (IPv6) communication method, while the network 145 can enable an IP version 4 (IPv4), which includes aspects incompatible with IPv6 (e.g., header format differences).

In one embodiment, the status module 116 can list data stored on the client or server for a particular user. In another exemplary embodiment, the status module 116 can indicate the status of one or entries stored on the client or server for a particular user. For example, an inspection stored on the client or server can be displayed on the client and labeled with its status (e.g., "in progress," "completed," or "to be completed") on a dashboard page of the client. In another exemplary embodiment, the status module 116 can display a notification on the client of a status change or a new requirement (e.g., new or re-inspection, capital plan generation, approval request, change request, etc.).

The authentication module 118 can authenticate the network 145. In one exemplary embodiment, the authentication module 118 can authenticate the network 145 or session using a username, password, authentication token, biometric, or other suitable attribute received from the client. In another exemplary embodiment, the authentication module 118 can generate an authentication token for a particular network, session, or request. In one exemplary embodiment, the authentication module 118 can generate an authentication token using network data from in the client. In another exemplary embodiment, the authentication module 118 can process at least a portion of the credentials and/or network information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In another exemplary embodiment, the authentication token can allow for single sign-on authentication to the server and/or memory from the client.

In one embodiment, the locomotive control stand system 206 can include the engine run module 120, direction management module 122, dynamic braking module 124, throttle control module 126, and the sand drop module 128. The engine run module 120, direction management module 122, dynamic braking module 124, throttle control module 126, and the sand drop module 128 can implement one or more algorithms to facilitate simulation of a locomotive components traveling on a railroad, including an engine startup, travel direction, and throttle algorithm. The algorithms and their associated thresholds and/or signatures can be programmable to suit a particular PTC simulation event, such as a penalty, emergency, or horn event, or another requirement. The locomotive control stand system 206 can be configured to transmit and receive messages related to locomotive simulations or other suitable activity, to and from the client or server. In another embodiment, the locomotive control stand system 206 can generate one or more elements for display on the display 302. The elements can provide additional information related to locomotive maneuvering. For example, a notification can be generated by the locomotive control stand system 206 and displayed on the display 302 to indicate a sensor output, a switch status, event monitoring, or other suitable information. Additionally, system symbols can be displayed on the client to indicate a current sensor output reading, an event status, an error event, or other relevant PTC system information.

In one embodiment, the engine run module 120 can generate a start instruction for an engine. For example, the engine run module 120 can generate the start instruction for a physical engine or a simulated engine. In an example, the start instruction corresponds to the simulated engine. In another example, the start instruction can include physical or virtual components. For example, the start instruction can include a physical switch on a dashboard, and when the physical switch is in an "on" state, the start instruction can enable the engine. In an example, the physical switch can include electrical and mechanical components allowing a trainee to enable the engine of the locomotive using an electrical to mechanical transducer to convert the electrical signal from the state of the physical switch to mechanical energy to enable the engine. In another example, the start instruction can include a virtual switch on a display, and when the virtual switch is in an "on" state, the start instruction can enable the engine. In an example, the virtual switch can include an icon on the display 302 allowing the trainee to enable the engine.

In an embodiment, one or more engine run thresholds can determine whether the control stand system 206 engages an engine run system of the locomotive to initialize an engine for the locomotive. The system can correspond a engine run threshold to a signal from the engine run module 120 to determine whether the engine run module 120 is active. For example, when the engine of the locomotive is enabled, a user activates a switch from an off position to an on position, or another means for activating a mechanical or an electromechanical system. In another example, when the system receives an improper engine run instruction outside of the engine run threshold, the system can generate an error. The error notification can correspond to at least one fault switch for troubleshooting purposes.

In one embodiment, the direction management module 122 can direct the locomotive to travel in a particular direction based on a direction instruction. For example, the locomotive can include a physical locomotive or a simulated locomotive. In an example, the direction management module 122 can direct the simulated locomotive in the particular direction based on the direction instruction. For example, the direction management module 122 can indicate either a forward motion or a backward motion. In another example, the direction management module 122 can include physical or virtual components. For example, the direction instruction can include a physical lever on a dashboard, and when the trainee moves the physical lever in a desired direction, the direction instruction can engage wheels of the locomotive to move in the desired direction. In an example, the physical lever can include electrical and mechanical components allowing the trainee to engage the locomotive using an electrical to mechanical transducer to convert the electrical signal from the movement of the physical lever to mechanical energy to rotate the wheels. In another example, the direction instruction can include a virtual sliding scale on a display, and when the trainee moves the virtual sliding scale from one end of the scale to another, the direction instruction can engage the wheels of the locomotive. In an example, the virtual sliding scale can include an icon on the display 302 allowing the trainee to engage the locomotive.

In one embodiment, the dynamic braking module 124 can transmit a dynamic brake instruction. For example, the dynamic brake instruction can include a binary operation to indicate whether dynamic braking is active. In another example, the dynamic braking module 124 can transmit the dynamic brake instruction to the TMC 104 to engage brakes of the locomotive corresponding to a dynamic brake system not shown in the present disclosure. In an embodiment, one or more dynamic braking thresholds can determine whether the control stand system 206 engages a dynamic braking system of the locomotive to initialize an adaptive braking process for the locomotive. The system can correspond a dynamic braking threshold to a signal from the dynamic braking module 124 to determine whether the dynamic braking module 124 is active. For example, when the dynamic braking system is active, a user activates a switch from an off position to an on position, or another means for activating an electromechanical system. In another example, when the system receives an improper dynamic brake instruction outside of the dynamic braking threshold, the system can generate an error. The error notification can correspond to at least one fault switch for troubleshooting purposes.

In one embodiment, the throttle control module 126 can control a throttle of the locomotive based on a throttle instruction. For example, the throttle control module 126 can control the throttle of a physical locomotive or a simulated locomotive. In an example, the throttle control module 126 can indicate the throttle instruction based on a physical or virtual components. For example, the throttle instruction can include a physical lever on a dashboard, and when the trainee moves the physical lever in a desired direction, the throttle instruction can engage wheels of the locomotive to move at a desired speed. In an example, the physical lever can include electrical and mechanical components allowing the trainee to engage the locomotive using an electrical to mechanical transducer to convert the electrical signal from the movement of the physical lever to mechanical energy to engage the throttle of the locomotive. In another example, the throttle instruction can include a virtual sliding scale on a display, and when the trainee moves the virtual sliding scale from one end of the scale to another, the throttle instruction can engage the wheels of the locomotive. In an example, the virtual sliding scale can include an icon on the display 302 allowing the trainee to engage the locomotive.

In an embodiment, one or more throttle control thresholds can determine whether the control stand system 306 engages a throttle of the locomotive to move the locomotive in a particular direction. For example, when the throttle includes physical components, the throttle can slide forward past a throttle control threshold to indicate a forward direction at a speed proportional to a distance the throttle moved. Alternatively, the throttle can slide backwards past the throttle control threshold to indicate a reverse direction at a speed proportional to a distance the throttle moved. In the foregoing example, the throttle control module 126 can communicate speed and direction values with direction management logic (e.g. the direction management module 122). In another example, when the system receives a throttle instruction outside of an expected input, the system can generate an error. The error notification can correspond to at least one fault switch for troubleshooting purposes.

By way of further example, the locomotive can include throttle control thresholds to impose safety measures to control a speed of the locomotive. For example, when the throttle slides past a high-end throttle control threshold, the system can govern the speed of the locomotive by remaining at a speed as if the throttle was at the high-end throttle control threshold. The high-end throttle control threshold allows for the speed of the train to stay below a predetermined speed to follow safety procedures. In an example, the governing by the system can include a mechanically-controlled manner and an electrically-controlled manner. For example, the mechanically-controlled manner can include physical components to limit the throttle from increasing engine speed. In an example, the physical components can include a hydraulic governor to regulate engine speed. In another example, the electrically-controlled manner can include electromechanical components to limit engine speed. For example, the electromechanical components can include various power servo motors on a hydraulic governor to remotely control fuel intake.

In one embodiment, the sand drop module 128 can control a sandbox on the locomotive based on a sand drop instruction. For example, the sand drop module 128 can control the sandbox of a physical locomotive or a simulated locomotive. In an example, the sand drop module 128 can indicate the sand drop instruction based on a physical or virtual components. For example, the sand drop instruction can include a moveable physical handle on a dashboard, and when the trainee moves the physical handle in a direction, the sand drop instruction can engage the sandbox of the locomotive to disperse sand on the tracks for increased wheel stability. In an example, the physical handle can include electrical and mechanical components allowing the trainee to engage the locomotive using an electrical to mechanical transducer to convert the electrical signal from the movement of the physical handle to mechanical energy to engage the sandbox of the locomotive. In another example, the sand drop instruction can include a virtual sliding scale on a display, and when the trainee moves the virtual sliding scale from one end of the scale to another, the sand drop instruction can engage the sandbox of the locomotive. In an example, the virtual sliding scale can include an icon on the display 302 allowing the trainee to engage the locomotive.

In an embodiment, one or more sand drop thresholds can determine whether the control stand system 306 engages a sand drop system of the locomotive to initialize a process to release sand for the locomotive. For example, the sand can be dropped onto the track to increase traction of the wheels of the locomotive. The system can relate a sand drop threshold to a signal from the sand drop module 128 to determine whether the sand drop module 128 is active. For example, when the sand drop system is enabled, a user activates a switch from an off position to an on position, or another means for activating an electromechanical system. In another example, when the system receives an improper sand drop instruction outside of the sand drop threshold, the system can generate an error. The error notification can correspond to at least one fault switch for troubleshooting purposes.

In one embodiment, the PTC system 208 can include the pneumatic module 130, frequency generator module 132, antenna assembly module 134, and power supply module 136. The pneumatic module 130, frequency generator module 132, antenna assembly module 134, and power supply module 136 can implement one or more algorithms to facilitate automated workflow and simulate a PTC system event, including magnetic valve, interval delay relay, and pulse conversion relay algorithms. The algorithms and their associated thresholds and/or signatures can be programmable to suit a particular pneumatic system, application, function, facility, or other requirement. The PTC system 208 can be configured to transmit and receive messages related to workflow automation or other suitable activity, to and from the TMC 104. In another embodiment, the PTC system 208 can generate one or more elements for display on the user device. The elements can provide additional information related to PTC system simulation. For example, a notification can be generated by the PTC system 208 and displayed on the client to indicate an air pressure, reservoir level, brake pipe status, or other suitable information. Additionally, system symbols can be displayed on the display 302 to indicate an event status, sensor output, or PTC simulation status.

In one embodiment, the pneumatic module 130 can control air pressure based on a state of the PTC simulation. For example, the PTC simulation can include a penalty, emergency, and horn event. In an example, when the PTC simulation indicates the penalty event, the pneumatic module 130 can supply compressed air to electromechanical components of the penalty assembly 318. For example, the pneumatic module 130 can transmit electrical signals to one or more magnetic valves to control compressed air from an air compressor. In an example, the pneumatic module 130 can supply the compressed air to brake pipe pressure transducers, a brake cylinder pressure transducer, and/or an equalizer reservoir pressure transducer. In another example, when the PTC simulation indicates the penalty event, the pneumatic module 130 can supply the compressed air to the electromechanical components to control a motion of the locomotive. For example, the motion of the locomotive can include a physical response or a simulated response. In an example, the physical response can include slowing the locomotive. In another example, the simulated response can include a virtual equivalent of the physical response, such as a digital sensor output on the display 302 indicating a reduction in speed of the locomotive.

In an embodiment, one or more pneumatic thresholds can determine whether the simulation system 208 performs a particular PTC system simulation event. For example, the system can receive an electrical signal instructing the system to execute a penalty event. The system can include pneumatic thresholds to identify a pressure of a pneumatic system to identify whether the penalty event occurred. For example, the penalty system operates at a pressure of 90 psi. So, when the system receives an instruction to execute an emergency event, the system verifies the pressure of the pneumatic system. In an example, the system can execute the emergency event after the penalty event activates. For example, the system can identify the pneumatic system is active based on the pressure, then the system can activate the emergency event. The pneumatic thresholds can correlate with various pressure values of the pneumatic system. By way of another example, the system can receive an instruction for the emergency event and the pneumatic system has a pressure lower than the pneumatic threshold. The system then can generate an error notification. In an example, the error notification can include troubleshooting instructions for a user. The error notification can correspond to at least one cutout switch.

In one embodiment, the frequency generator module 132 can generate electronic signals with set properties of amplitude, frequency, and wave shape. For example, the frequencies generate signals used as a stimulus for electronic measurements. In an example, the frequency generator module 132 can generate various frequencies to represent physical events of the locomotive. For example, the physical events can include wheel speed indications. In an example, the frequency generator module 132 can synthesize the frequencies corresponding to the wheel speed indications based on a relation between a wheel speed and rotational frequency.

In one embodiment, the antenna assembly module 134 can communicate wirelessly using particular radio frequencies. For example, the antenna assembly module 134 can transmit and receive information using wireless communications corresponding to the radio frequencies. In an example, the antenna assembly module 134 can transmit and receive wireless communications at a frequency of 220 megahertz (MHz). In another example, the antenna assembly module 134 can transmit and receive information using wireless communication channels corresponding to radio frequencies of at least one wireless communication carrier. In another example, the antenna assembly module 134 can include global position system (GPS) capability to identify and verify geo-locations based on satellite positioning relative to the GPS system.

In one embodiment, the power supply module 136 can control a distribution of power to the various components of the simulation environment 100. For example, the power supply module 136 can receive a voltage from an external power source and determine the various components to distribute the voltage based on a type of the component. In another example, the power supply module 136 can control the voltage from the external power source and transform the voltage to a desired power level, frequency, or current type. For example, the power supply module 136 can determine the desired power level, frequency, or current type based on the component receiving the power. In an example, the power supply module 136 can transform a direct current power supply from the external power source to an alternating current for the various components requiring the alternating current. In another example, the power supply module 136 can distribute power to any, all, or none of the various components requiring power depending on the configuration of the simulation environment 100.

Figure 3:
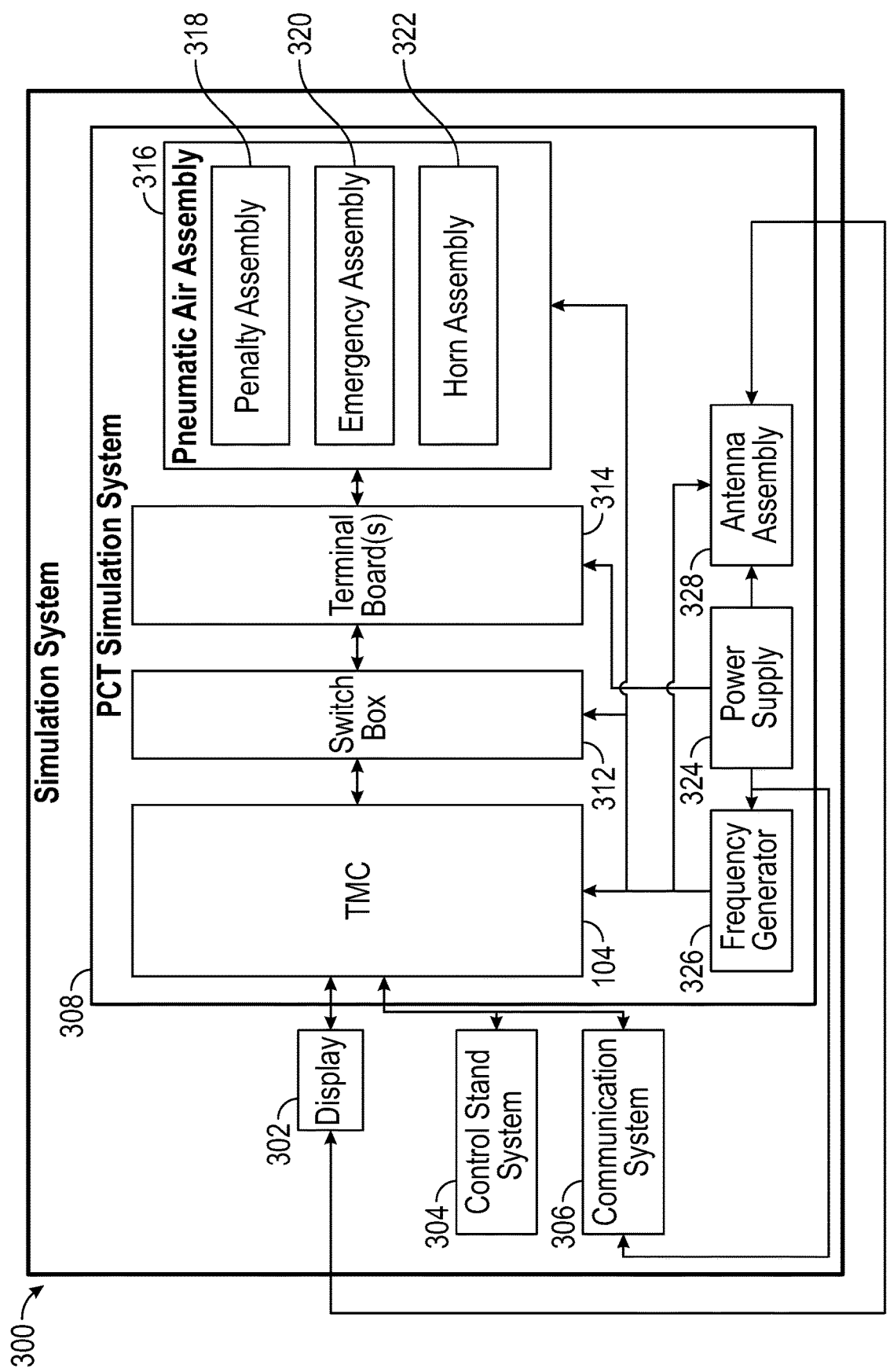
FIG. 3 illustrates a block diagram of a simulation system, in accordance with one or more embodiments of the present disclosure.

FIG. 3 illustrates a schematic view of a simulation assembly 300, in accordance with one or more embodiments of the present disclosure. The simulation assembly 300 can include a display 302, a control stand 304, a communication assembly 306, and a PTC simulation assembly 308, a power supply 324, a frequency generator 326, and an antenna assembly 328. The PTC simulation assembly 308 can include the TMC 104, a switch box 312, one or more terminal boards 314, a pneumatic air assembly 316. The pneumatic air assembly 316 can further include a penalty assembly 318, an emergency assembly 320, and a horn assembly 322. The aforementioned system components (e.g., server(s) 102 and client(s) 150, 152, 154, 156, etc.) can be communicably coupled to each other via physical connections, such that data can be transmitted. For example, the aforementioned system components can be coupled via copper cable, electrical interconnects, interface hardware such as peripheral component interface (PCI), serial advanced technology attachment (SATA), non-volatile memory express (NVMe), among other hardware interconnects.

The display 302 can provide a user an interface to receive and transmit instructions and relevant information. For example, the display 302 can provide the primary visual interface between the trainee and the cab signal system. In another example, the use of the display 302 for the present disclosure will be to simulate an environment of a locomotive using cab signaling. For example, the trainee will interface with simulations of real-world signals received while conducting a locomotive. In an example, the cab signaling can enforce a safe separation between trains and to stop or slow trains in advance of a restrictive situation. For example, the cab signaling in the simulation assembly 300 can simulate cab signaling continuous in-cab indication to inform the trainee of a simulated track condition ahead. In another example, the display 302 can simulate the cab signaling such as informing the trainee which, if any, mode the simulation assembly 300 might be in or if it is active at all. In another embodiment, the display 302 can communicate with the PTC simulation assembly 308 system, providing real-time input, a count-down to a penalty or a means by which to cancel an alarm.

The control stand 304 can integrate locomotive engine functional controls including brake functional controls, whereby the functional controls are within reach of the driver from his/her customary seating position, facing forward at all times. In an example, the control stand 304 can perform functionalities controlling the locomotive such as running the engine of the locomotive, controlling the direction the locomotive travels (e.g., forward or backward), enabling a dynamic braking system, controlling the throttle of the locomotive, and enabling a sand drop function, among other modules not included in this disclosure. For example, the dynamic braking system can include the use of an electric traction motor as a generator when slowing a vehicle such as an electric or diesel-electric locomotive. In another example, the control stand 304 can control the electric traction motor as part of the dynamic braking system. In an example, the sand drop function can include a component to carry sand to assist adhesion in poor rail conditions.

The communication assembly 306 can transmit and receive messages related to status monitoring or other suitable activity, to and from the client or server. In another embodiment, the communication assembly 306 can generate one or more elements for display on the client. The elements can provide additional information related to network connection quality. For example, a notification can be generated by communication assembly 306 and displayed on the client to indicate a status update, network connection status, user access login information, or other suitable information. Additionally, system symbols can be displayed on the client to indicate management status. In another example, the communication assembly 306 can include software and hardware to facilitate network connection. For example, the communication assembly 306 can include a router, switching fabric, a digital signal processor, network interface card (NIC), among other networking components.

The PTC simulation assembly 308 can provide a user a simulation of a PTC system using various components spanning hardware and software. For example, the simulation assembly 300 can transmit and receive information from the display 302 and the control stand 304 corresponding to an instance of simulated PTC system activity. For example, the PTC simulation assembly 308 can simulate the likes of a real-world PTC system when the real-world PTC system would alert the locomotive of a penalty event, an emergency event, or a horn event. For example, in a penalty event, the PTC simulation assembly 308 can alert the trainee when the locomotive performs maneuvers counter to a safety plan. In another example, the emergency event, the PTC simulation assembly 308 can alert the trainee when the locomotive performs maneuvers resulting in emergency or critical failure of one or more system components. In another example, in a horn event, the PTC simulation assembly 308 can alert the trainee when a horn of the locomotive is enabled.

The TMC 104 can be configured to provide data processing capabilities in the PTC simulation assembly 308. As such, the TMC 104 can include one or more of a digital processor, an analog processor, a digital circuit designed to process information, an analog circuit designed to process information, a state machine, and/or other mechanisms for electronically processing information, such as field programmable gate arrays (FPGAs) or application specific integrated circuits (ASICs). The TMC 104 can be a single entity or include a plurality of processing units. These processing units can be physically located within the same device, or the TMC 104 can represent processing functionality of a plurality of devices or software functionality operating alone, or in concert.

The TMC 104 can be configured to execute machine-readable instructions or machine learning modules via software, hardware, firmware, some combination of software, hardware, and/or firmware, and/or other mechanisms for configuring processing capabilities on the TMC 104. As used herein, the term "machine-readable instructions" can refer to any component or set of components that perform the functionality attributed to machine-readable instructions. This can include one or more TMC 104 during execution of processor-readable instructions, the processor-readable instructions, circuitry, hardware, storage media, or any other components.

The TMC 104 can be configured with machine-readable instructions having one or more functional modules. The machine-readable instructions can include control logic for implementing various functionality, as described in more detail below. The machine-readable instructions can include certain functionality associated with the simulation assembly 300. Additionally, the machine-readable instructions can include instructions that can process, read, and write data to the display 302, the control stand 304, the power supply 324, or any other component of the simulation assembly 300.

The TMC 104 can include electronic storage including non-transitory storage media that electronically stores information. The electronic storage media can include one or both systems storage that can be provided integrally (e.g., substantially non-removable) with the TMC 104 and/or removable storage that can be removably connectable to the TMC 104 via, for example, a port (e.g., a Universal Serial Bus (USB) port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., erasable electronic programmable read only memory (EEPROM), random access memory (RAM), etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions, software algorithms, control logic, data generated by processor(s), data received from server(s), data received from computing platform(s), and/or other data that can enable server(s) to function as described herein. The electronic storage can also include third-party databases accessible via a network.

The switch box 312 can include a collection of one or more switches. For example, the switches can include electrical switches, electromechanical switches, relays among other types of switches. In an example, electrical switches can include an electrical component that can disconnect or connect the conducting path in an electrical circuit, interrupting the electric current or diverting it from one conductor to another. In another example, the switches can operate by process variables such as pressure, temperature, flow, current, voltage, and force, acting as sensors in a process and used to automatically control a system. In another example, the switches can include a relay which can include a switch that is operated by another electrical circuit.

The terminal board(s) 314 can include an insulating slab on which electronic terminals are mounted. For example, the terminal board(s) 314 can include one of various materials commonly used as the insulating slab. In an example, the insulating slab can include materials such as polyester, teflon, silicon wafer, among other insulating materials. In another example, the electronic terminals can include inputs or outputs from various electronic components used in the simulation assembly 300. In an example, the inputs and outputs can include copper terminals from switches, relays, or some other electronic component. In another example, the terminal board(s) 314 can provide an interface between the TMC 104 and the pneumatic air assembly 316. For example, the terminal board(s) 314 are physically coupled to each of the switch box 312 and the pneumatic air assembly 316 using a conductive material. In another example, the terminal board(s) 314 can route a plurality of inputs from the switch box 312 as outputs to the pneumatic air assembly 316 based on a circuit schematic of the simulation assembly 300. For example, the switch box 312 can transmit the output from a penalty cutout switch of the switch box 312 to the terminal board(s) 314, and in turn, the terminal board(s) 314 can transmit the output from the penalty cutout switch to the corresponding component in the pneumatic air assembly 316.

The pneumatic air assembly 316 can receive an electrical input and convert the electrical input to mechanical energy to control air pressure. In an example, the pneumatic air assembly 316 can include at least three systems. For example, the at least three systems can include a penalty assembly 318, an emergency assembly 320, and a horn assembly 322. In an example, the pneumatic air assembly 316 can interconnect the components of the at least three systems using a combination of electrical and electromechanical components. For example, the inputs to the pneumatic air assembly 316 can include conductive wire or cable to transmit various electrical signals representing information from the terminal board(s) 314. Alternatively, in another example, the pneumatic air assembly 316 can include electromechanical magnetic valves to transduce electrical energy to mechanical energy for building and releasing air pressure. For example, a magnetic valve can use magnetic actuation to enhance response time and improve stability positioning.

The penalty assembly 318 can receive an electrical input and convert the electrical input to mechanical energy to control air pressure based on a penalty instruction from the TMC 104. For example, the penalty instruction from the TMC 104 can correspond to a trainee mishandling the simulation assembly 300. In an example, the trainee can mishandle components of the control stand 304 resulting in the TMC 104 to execute the penalty instruction, which in turn, results in the penalty assembly 318 receiving the penalty instruction. Alternatively, in another example, the penalty assembly 318 can include components energized at all times. For example, the penalty assembly 318 can include at least one magnetic valve in a state of being energized at all times, and when a voltage from the at least one magnetic valve decreases to a pneumatic threshold, the penalty assembly 318 will be engaged.

The emergency assembly 320 can receive an electrical input and convert the electrical input to mechanical energy to control air pressure based on an emergency instruction from the TMC 104. For example, the emergency instruction from the TMC 104 can correspond to a trainee mishandling the simulation assembly 300. In an example, when the voltage of the magnetic valve in the penalty assembly 318 lowers, the drop in voltage instructs the emergency instruction to execute, which in turn, results in the emergency assembly 320 to be enabled. Alternatively, in another example, the emergency assembly 320 can include components in a low energy state at times other than when the magnetic valve of the penalty assembly 318 is in a low voltage state.

The horn assembly 322 can receive an electrical input and convert the electrical input to mechanical energy to control air pressure based on a horn instruction from the TMC 104. For example, the horn instruction from the TMC 104 can correspond to a trainee instructing the simulation assembly 300 to activate the horn of the locomotive. In an example, when the trainee executes the horn, the action by the trainee instructs the horn instruction to execute, which in turn, results in the horn assembly 322 to be enabled. Alternatively, in another example, the horn assembly 322 can include components in a low energy state at times other than when the trainee activates the horn.

The power supply 324 can include an electrical device that supplies electric power to an electrical load. For example, the power supply can convert electric current from a source to the correct voltage, current, and frequency to power a load. In an example, the load can include the various components of the simulation assembly 300. For example, the power supply 324 can distribute the proper voltages from an external bench power supply to generate the excitation for the functionality of the electrical aspect corresponding to the pneumatic air assembly 316, along with the components of the control stand 304. In another example, the bench power supply can include a 65 volt and 1.65 amp power supply. In an example, the proper voltages can include positive and negative voltages which are then transmitted to the various locations discussed above.

The frequency generator 326 can include an electronic device to generate electronic signals with set properties of amplitude, frequency, and wave shape. For example, the frequencies generate signals used as a stimulus for electronic measurements. In an example, the frequency generator 326 can generate various frequencies for wheel speed indications. For example, the frequencies can correspond to the wheel speed indications based on a relation between a wheel speed and rotational frequency.

The antenna assembly 328 can include at least one antenna for communicating wirelessly using particular frequencies. For example, the antenna assembly 328 can include at least one antenna system for transmitting and receiving wireless communications. In an example, the antenna assembly 328 can transmit and receive wireless communications at a frequency of 220 megahertz (MHz). In another example, the antenna assembly 328 can include at least one cellular antenna assembly corresponding to at least one wireless communication carrier for transmitting and receiving information using wireless communication channels corresponding to radio frequencies of at least one wireless communication carrier. In another example, the antenna assembly 328 can include global position system (GPS) capability to identify and verify geo-locations based on satellite positioning relative to the GPS system.

Figure 4:
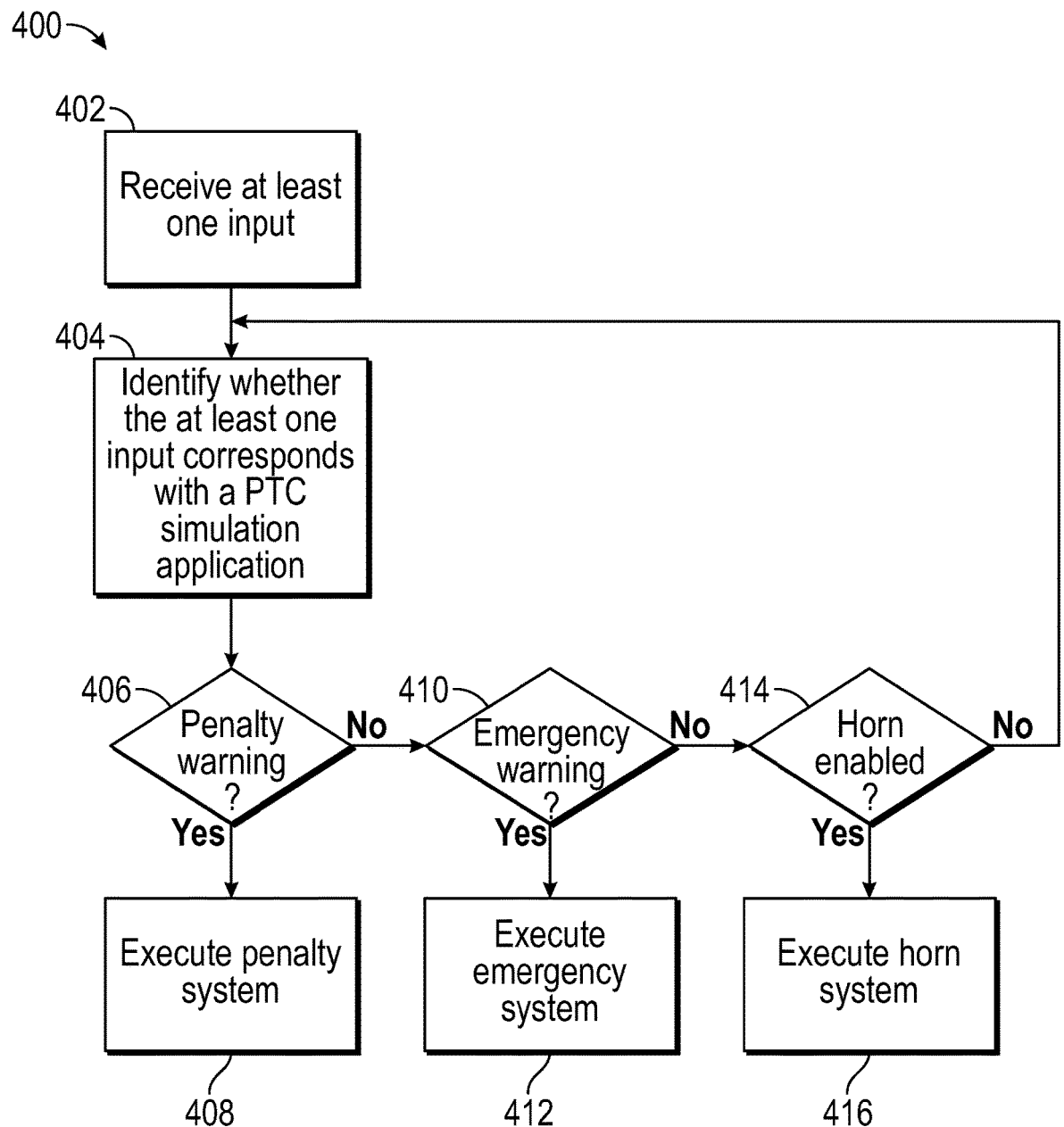
FIG. 4 illustrates a flowchart exemplifying simulation control logic, in accordance with one or more embodiments of the present disclosure.

FIG. 4 illustrates a flowchart exemplifying simulation control logic 400, in accordance with one or more embodiments of the present disclosure. The simulation control logic 400 can be implemented as an algorithm on the TMC 104, a machine learning module, a client, a database, or other suitable system. Additionally, the simulation control logic 400 can implement or incorporate one or more features of the PTC simulation system 200, including the display management system 202, communication system 204, locomotive control stand system 206, and PTC system 208. The simulation control logic 400 can be achieved with software, hardware, an API, a network connection, a network transfer protocol, HTML, DHTML, JavaScript, Dojo, Ruby, Rails, other suitable applications, or a suitable combination thereof.

The simulation control logic 400 can leverage the ability of a computer platform to spawn multiple processes and threads by processing data simultaneously. The speed and efficiency of the simulation control logic 400 can be greatly improved by instantiating more than one process to implement data lifecycle management. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The termination control logic 400 then proceeds to step 402.

At step 402, in an embodiment, the control logic 400 can receive at least one input. For example, the control logic 400 can categorize the at least one input based on a message type, instruction label, or some other method to organize digital information. In another example, the at least one input can correspond with a PTC simulation application. In an example, the at least one input can include a penalty warning, an emergency warning, and a horn enabled. In an example, the PTC simulation application can include actions from the systems and assemblies discussed in the present disclosure. For example, the penalty warning can correspond to actions and functions of the penalty assembly 318 of the pneumatic air assembly 316. In another example, the penalty warning can correspond to actions and functions of the pneumatic module 130 of the PTC system 208. Similarly, for example, the emergency warning can correspond to the emergency assembly 320 and the pneumatic module 130. Similarly, for example, the horn enabled can correspond to the horn assembly 322 and the pneumatic module 130. The control logic 400 proceeds to step 404.

At step 404, in an embodiment, the control logic 400 can identify whether the at least one input corresponds with a PTC simulation application. For example, the control logic 400 compare the at least one input with known instruction values to determine whether the at least one input matches the known values. The control logic 400 then proceeds to step 406.

At step 406, in an embodiment, the control logic 400 can determine whether the at least one input corresponds with a penalty warning. For example, the control logic 400 can parse the at least one input and compare content of the at least one input with a known penalty value, returning an affirmative response when the at least one input matches the known penalty value. If the at least one input is not the penalty warning, the control logic 400 proceeds to step 410. If the at least one input is the penalty warning, the control logic 400 then proceeds to step 408.

At step 408, in an embodiment, the control logic 400 can execute a penalty system. For example, the penalty system can include various electrical and mechanical components to apply compressed air to a brake system. In another example, the brake system can include a physical locomotive brake system or a simulation of the physical locomotive brake system.

At step 410, in an embodiment, the control logic 400 can determine whether the at least one input corresponds with an emergency warning. For example, the control logic 400 can parse the at least one input and compare content of the at least one input with a known emergency value, returning an affirmative response when the at least one input matches the known emergency value. If the at least one input is not the emergency warning, the control logic 400 proceeds to step 414. If the at least one input is the emergency warning, the control logic 400 then proceeds to step 412.

At step 412, in an embodiment, the control logic 400 can execute an emergency system. For example, the penalty system can include various electrical and mechanical components to apply compressed air to a brake system. In another example, the brake system can include a physical locomotive brake system or a simulation of the physical locomotive brake system.

At step 414, in an embodiment, the control logic 400 can determine whether the at least one input corresponds with a horn enabled status. For example, the control logic 400 can parse the at least one input and compare content of the at least one input with a known horn enabled value, returning an affirmative response when the at least one input matches the known horn enabled value. If the at least one input is not the horn enabled status, the control logic 400 proceeds to step 404. If the at least one input is the horn enabled status, the control logic 400 then proceeds to step 416.

At step 416, in an embodiment, the control logic 400 can execute a horn system. For example, the control logic 400 can complete a horn circuit to enable a horn. In an example, the horn is a physical locomotive horn or a simulated locomotive horn.

Figure 5:
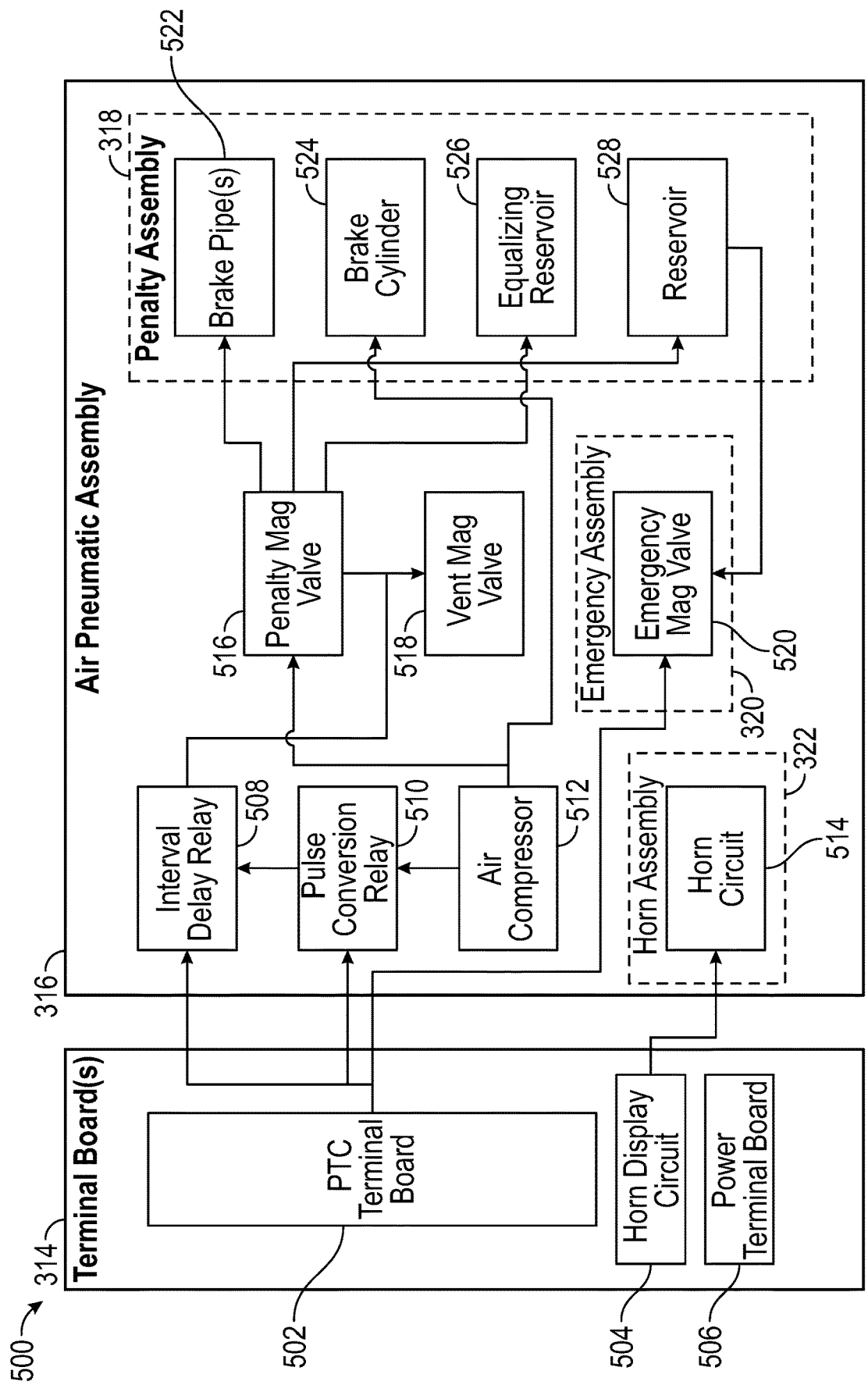
FIG. 5 illustrates a block diagram exemplifying an air pneumatic system, in accordance with one or more embodiments of the present disclosure.

FIG. 5 illustrates a block diagram of an air pneumatic system 500, in accordance with one or more embodiments of the present disclosure. The air pneumatic system 500 can include the terminal board(s) 314, the PTC terminal board 502, the horn display circuit 504, the power terminal board 506, the pneumatic air assembly 316. The pneumatic air assembly 316 can include the penalty assembly 318, the emergency assembly 320, and the horn assembly 322. The pneumatic air assembly 316 can include an interval delay relay 508, pulse conversion relay 510, air compressor 512, horn circuit 514, penalty magnetic valve 516, vent magnetic valve 518, emergency magnetic valve 520, brake pipe(s) 522, brake cylinder 524, equalizing reservoir 526, and a reservoir 528. The aforementioned system components can be coupled to each other via physical connections. For example, the aforementioned system components can be coupled via copper cable, electrical interconnects, interface hardware, among other electrical hardware interconnects. In another example, the aforementioned system components can be coupled via mechanical fittings, clamps, mechanical valves, pipes, among other mechanical hardware interconnects.

The interval delay relay 508 can control an output based on a time delay. For example, the interval delay relay 508 can change from an open state to a closed state before or after the time delay. In an example, upon application of an input voltage, an output of the interval delay relay 508 can become energized and a time delay begins. For example, at the end of the time delay, the output is de-energized. In an example, the input voltage must be removed to reset the time delay relay. In an example, the time delay can be seven seconds. In another example, the interval delay relay 508 can control an input of the pulse conversion relay 510.

The pulse conversion relay 510 can provide isolated channels between inputs to convert the inputs into pulse form. For example, the inputs can include inputs from the interval delay relay 508, the PTC terminal board(s) 414, the air compressor 512, among other inputs from the components of the air pneumatic system 500. In another example, the pulse conversion relay 510 can include output pulses having a pulse with a width corresponding to the inputs. For example, the output pulses can include a direct current output based on an alternating current input.

The air compressor 512 can include a pneumatic device that converts power into potential energy stored in pressurized air. For example, the air compressor can force air into a storage tank (not shown in FIG. 5), increasing the pressure, when the storage tank pressure reaches an upper limit, the air compressor 512 can shut off. In an example, the air compressor 512 can provide compressed air to the penalty magnetic valve 516 and the brake cylinder 524. In another example, the compressed air can include pressures of 58 psi, 72 psi, and 90 psi. For example, the compressed air can be 58 psi when the PTC simulation enables the penalty application.

The horn circuit 514 can receive at least one input and convert the electrical input to mechanical energy to control air pressure based on a horn instruction. For example, the horn circuit 514 can include at least one resistor modeling the horn system. In an example, when the horn circuit 514 receives the input, the horn circuit 514 can complete the circuit and energize the resistor resulting in an audible sound. In another example, the horn instruction can correspond to a trainee instructing the simulation assembly 300 to activate the horn system of the locomotive. In an example, when the trainee executes the horn system, the action by the trainee instructs the horn instruction to execute, which in turn, results in the horn circuit 514 to be completed. Alternatively, in another example, the horn circuit 514 can include components in a low energy state at times other than when the horn system is activated.

The penalty magnetic valve 516 can include an electromechanical magnetic valve to transduce electrical energy to mechanical energy for building and releasing air pressure. For example, the penalty magnetic valve 516 can use magnetic actuation to enhance response time and improve stability positioning. In an example, the penalty magnetic valve 516 can receive at least one input. For example, the at least one input can include an input from the PTC terminal board(s) 414. In another example, the penalty magnetic valve 516 can include at least one output. For example, the at least one output can include outputs to the brake pipe(s) 522, the equalizer reservoir 520, and the reservoir 528. In another example, the input can instruct the penalty magnetic valve 516 to de-energize. For example, when the penalty magnetic valve 516 receives the instruction to de-energize, the penalty magnetic valve 516 can transfer the output from a pressure setting of 90 psi to 58 psi. In an example, the output with the 58 psi pressure can provide the compressed air to the equalizing reservoir 526 and brake pipe(s) 522. In another example, the output with the 90 psi can supply the compressed air to be vented.

The vent magnetic valve 518, can include an electromechanical magnetic valve to transduce electrical energy to mechanical energy for building and releasing air pressure. For example, the vent magnetic valve 518 can use magnetic actuation to enhance response time and improve stability positioning. In an example, the vent magnetic valve 518 can receive at least one input. For example, the at least one input can include inputs from the PTC terminal board(s) 414 and the interval delay relay 508. In another example, the vent magnetic valve 518 can include at least one output. For example, the at least one output can include outputs to a choke of the vent magnetic valve 518. In another example, the input can instruct the vent magnetic valve 518 to energize. For example, when the vent magnetic valve 518 receives the instruction to energize, the vent magnetic valve 518 and the reservoir 528 can vent an output from the penalty magnetic valve 516 from a pressure setting of 90 psi to 58 psi.

The emergency magnetic valve 520 can include an electromechanical magnetic valve to transduce electrical energy to mechanical energy for building and releasing air pressure. For example, the emergency magnetic valve 520 can use magnetic actuation to enhance response time and improve stability positioning. In an example, the emergency magnetic valve 520 can receive at least one input. For example, the at least one input can include inputs from the PTC terminal board(s) 414. In another example, the emergency magnetic valve 520 can include at least one output. For example, the at least one output can include outputs to an exhaust of the emergency magnetic valve 520. In another example, the input can instruct the emergency magnetic valve 520 to energize. For example, when the emergency magnetic valve 520 receives the instruction to energize, the emergency magnetic valve 520 and the reservoir 528 can vent compressed air being applied to the brake pipe(s) 522 from to 0 psi.

The brake pipe(s) 522 can include a railway brake power braking system using compressed air as the operating medium. For example, the brake pipe(s) 522 can apply compressed air to push on the brake cylinder 524. In an example, the piston is connected through mechanical linkage to brake shoes that can rub on the train wheels, using the resulting friction to slow the train. In another example, the brake pipe(s) 522 can include pressure sensors showing an increased or decreased pressure in the brake pipe(s) 522. For example, when the PTC simulation applies the emergency application, compressed air is vented from the brake pipe(s) 522 to decrease the pressure. In an example, the decrease in pressure can result in fully applying the brake system of the locomotive. In another example, the decrease in pressure can result in the pressure sensors corresponding to the brake pipe(s) 522 to show no pressure.

The brake cylinder 524 can include a housing, which can include a piston attached to the braking system of the locomotive. For example, a force on the piston can transfer through the brake system to apply a brake shoe force onto the wheel. In an example, the brake cylinder 524 can apply compressed air to the brake system of a physical locomotive or a simulation of the locomotive. For example, the simulation of the locomotive can include at least one pressure sensor to indicate a pressure of the compressed air from the brake cylinder 524 to the brake system. In an example, the brake cylinder 524 can apply the compressed air in response to the PTC simulation enabling the penalty application.

The equalizing reservoir 526 can include a cylinder providing a reference pressure to regulate pressure in the brake pipe(s) 522. For example, when the equalizing reservoir 526 reduces a pressure, the brake pipe(s) 522 reduce pressure. In an example, the equalizing reservoir 526 can reduce the pressure in the brake pipe(s) 522 to slow the locomotive. In another example, the equalizing reservoir 526 can reduce the pressure in the brake pipe(s) 522 resulting in a simulated locomotive to reduce pressure in at least one pressure sensor.

The reservoir 528 can store compressed air to later be used. For example, the reservoir 528 can accumulate and store the compressed air until releasing at a later time. In another example, the reservoir 528 can supplement the compressed air in the air pneumatic system 600 as a compressed air control system. For example, the reservoir 528 can accumulate the compressed air from the penalty magnetic valve 516. In an example, when the penalty magnetic valve 516 vents the compressed air, the reservoir 528 can supply the vent magnetic valve 518 with the compressed air to control the penalty magnetic valve 516 venting process.

Figure 6:
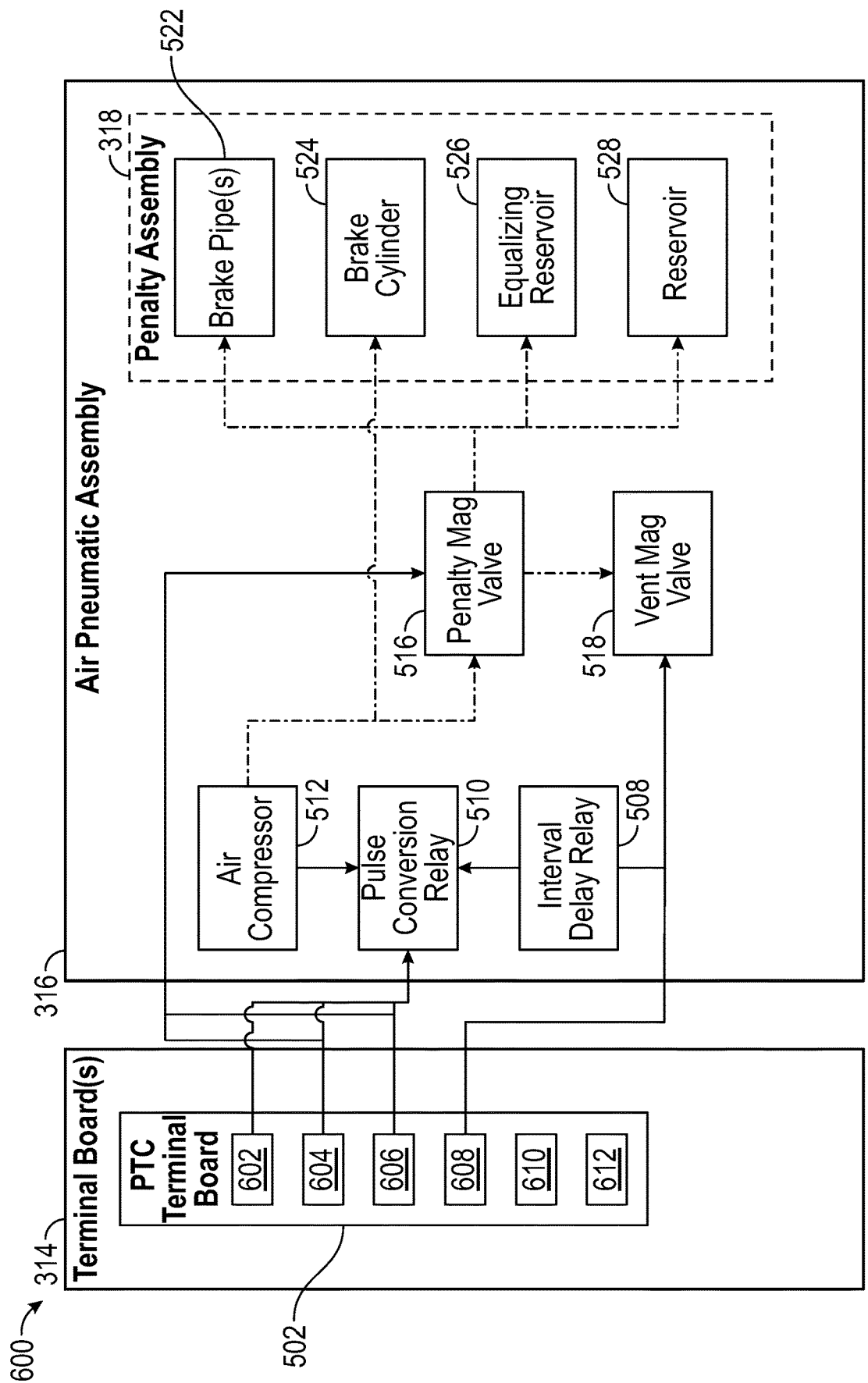
FIG. 6 illustrates a block diagram exemplifying a penalty application assembly, in accordance with one or more embodiments of the present disclosure.

FIG. 6 illustrates a block diagram exemplifying a penalty application assembly 600, in accordance with one or more embodiments of the present disclosure. The penalty application assembly 600 can include the terminal board(s) 314 and the PTC terminal board 502. The PTC terminal board 502 can include terminals 602-612. The penalty application assembly 600 can further include the pneumatic air assembly 316, which includes the air penalty assembly 318, the interval delay relay 508, the pulse conversion relay 510, the air compressor 512, the penalty magnetic valve 516, and the vent magnetic valve 518. The penalty assembly 318 can include the brake pipe(s) 522, the brake cylinder 524, the equalizing reservoir 526, and the reservoir 528.

The aforementioned system components can be coupled through electrical or mechanical means. For example, the terminals 602-612 can operably couple with the interval delay relay 508, pulse conversion relay 510, penalty magnetic valve 516, and vent magnetic valve 518 using electrical components. In an example, the electrical components can include conductive wire to transfer electrical signals (e.g., the electrical signals indicating a transfer of information and/or power). In another example, the air compressor 512, the penalty magnetic valve 516, the vent magnetic valve 518, and the penalty assembly 318 can interconnect with mechanical components to transfer compressed air (i.e., designated in FIG. 6 with dash dot lines). In an example, the mechanical components can include rigid or flexible hose, made of various types of material.

The terminal 602, can include provide electrical signals as an output. For example, the electrical signals can include instructions to enable the pulse conversion relay 508. In another example, the terminal 602 can be operably coupled to the pulse conversion relay 508.

The terminal 604, can include provide electrical signals as an output. For example, the electrical signals can include instructions to enable the pulse conversion relay 510 and the penalty magnetic valve 516. In another example, the terminal 604 can be operably coupled to the pulse conversion relay 508 and the penalty magnetic valve 516.

The terminal 606, can include provide electrical signals as an output. For example, the electrical signals can include instructions to enable the pulse conversion relay 510 and the penalty magnetic valve 516. In another example, the terminal 606 can be operably coupled to the pulse conversion relay 508 and the penalty magnetic valve 516.

The terminal 608, can include provide electrical signals as an output. For example, the electrical signals can include instructions to enable the vent magnetic valve 518. In another example, the terminal 608 can be operably coupled to the vent magnetic valve 518.

The terminal 610 and the terminal 612, can be disconnected from the elements shown in FIG. 6.

Figure 7:
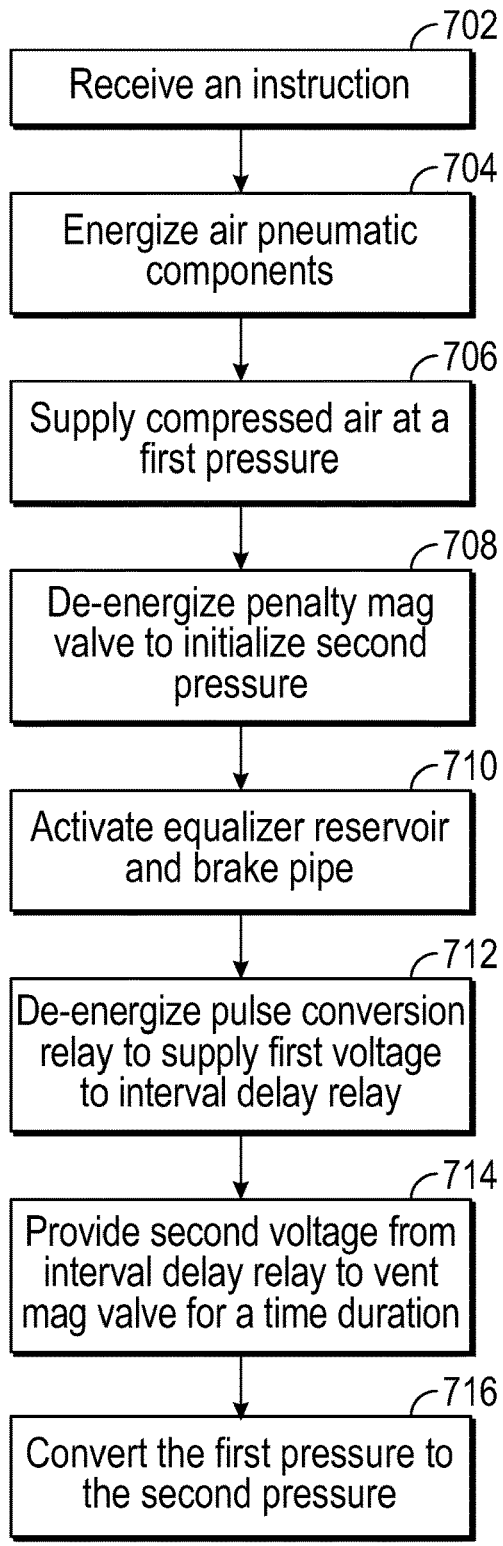
FIG. 7 illustrates a flowchart exemplifying a penalty application control logic, in accordance with one or more embodiments of the present disclosure.

FIG. 7 illustrate a flowchart exemplifying a penalty application control logic 700, in accordance with one or more embodiments of the present disclosure. The penalty application control logic 700 can be implemented as an algorithm on the TMC 104, a machine learning module, a client, a database, or other suitable system. Additionally, the penalty application control logic 700 can implement or incorporate one or more features of the PTC simulation system 200, including the display management system 202, communication system 204, locomotive control stand system 206, and simulation system 208. The penalty application control logic 700 can be achieved with software, hardware, firmware, assembly language, machine instructions, an API, a network connection, a network transfer protocol, HTML, DHTML, JavaScript, Dojo, Ruby, Rails, other suitable applications, or a suitable combination thereof.

The penalty application control logic 700 can leverage the ability of a computer platform to spawn multiple processes and threads by processing data simultaneously. The speed and efficiency of the penalty application control logic 700 can be greatly improved by instantiating more than one process to implement data lifecycle management. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The penalty application control logic 700 then proceeds to step 702.

At step 702, in an embodiment, the control logic 700 can receive an instruction. For example, the instruction can correspond to a train penalty condition. In another example, the train penalty condition can correspond to a PTC application for simulation purposes. The control logic 700 proceeds to step 704.

At step 704, in an embodiment, the control logic 700 can energize air pneumatic components. For example, the air pneumatic components can include a pulse conversion relay, a penalty magnetic valve, an interval delay relay, and a vent magnetic valve. In another example, the control logic 700 generate electrical signals to energize the air pneumatic components. The control logic 700 then proceeds to step 706.

At step 706, in an embodiment, the control logic 700 can supply compressed air to the air pneumatic components at a first pressure. For example, the control logic 700 can supply the compressed air to the air pneumatic components at the first pressure for a penalty period. In an example, the air pneumatic components can include one or more pressure transducers. In an example, the one or more pressure transducers can include an equalizer reservoir pressure transducer and a brake pipe transducer. In another example, the first pressure can be 90 psi. In another example, the penalty period can correspond to a service rate to safely alter compressed air pressure. The control logic 700 the proceeds to step 708.

At step 708, in an embodiment, the control logic 700 can deenergize the penalty magnetic valve to initialize a second pressure. For example, the second pressure can be 58 psi. In another example, the control logic 700 can terminate an electrical signal to deenergize the penalty magnetic valve. The control logic 700 the proceeds to step 710.

At step 710, in an embodiment, the control logic 700 can activate the equalizer reservoir pressure transducer and the brake pipe transducer. For example, the control logic 700 can generate an electrical signal to activate the equalizer reservoir pressure transducer and the brake pipe transducer. The control logic 700 the proceeds to step 712.

At step 712, in an embodiment, the control logic 700 can deenergize a pulse conversion relay to supply a first voltage to an interval delay relay. For example, the control logic 700 can terminate the electrical signal to the pulse conversion relay to deenergize. In another example, the first voltage can be 74 volts. The control logic 700 the proceeds to step 714.

At step 714, in an embodiment, the control logic 700 can provide a second voltage from the interval delay relay to the vent magnetic valve for a time duration. For example, the control logic 700 can control a signal from the interval delay relay to the vent magnetic valve for the time duration. In an example, the time duration can be 7 seconds. In another example, the second voltage can be 74 volts. The control logic 700 the proceeds to step 716.

At step 716, in an embodiment, the control logic 700 can convert the first pressure to the second pressure. For example, convert the first pressure to the second pressure to simulate a train penalty condition. In an example, the control logic 700 can control the air pneumatic components to reduce the first pressure to the second pressure at the service rate. For example, the service rate can correspond with a pressure change rate from the first pressure to the second pressure based on various mechanical factors.

Figure 8A:
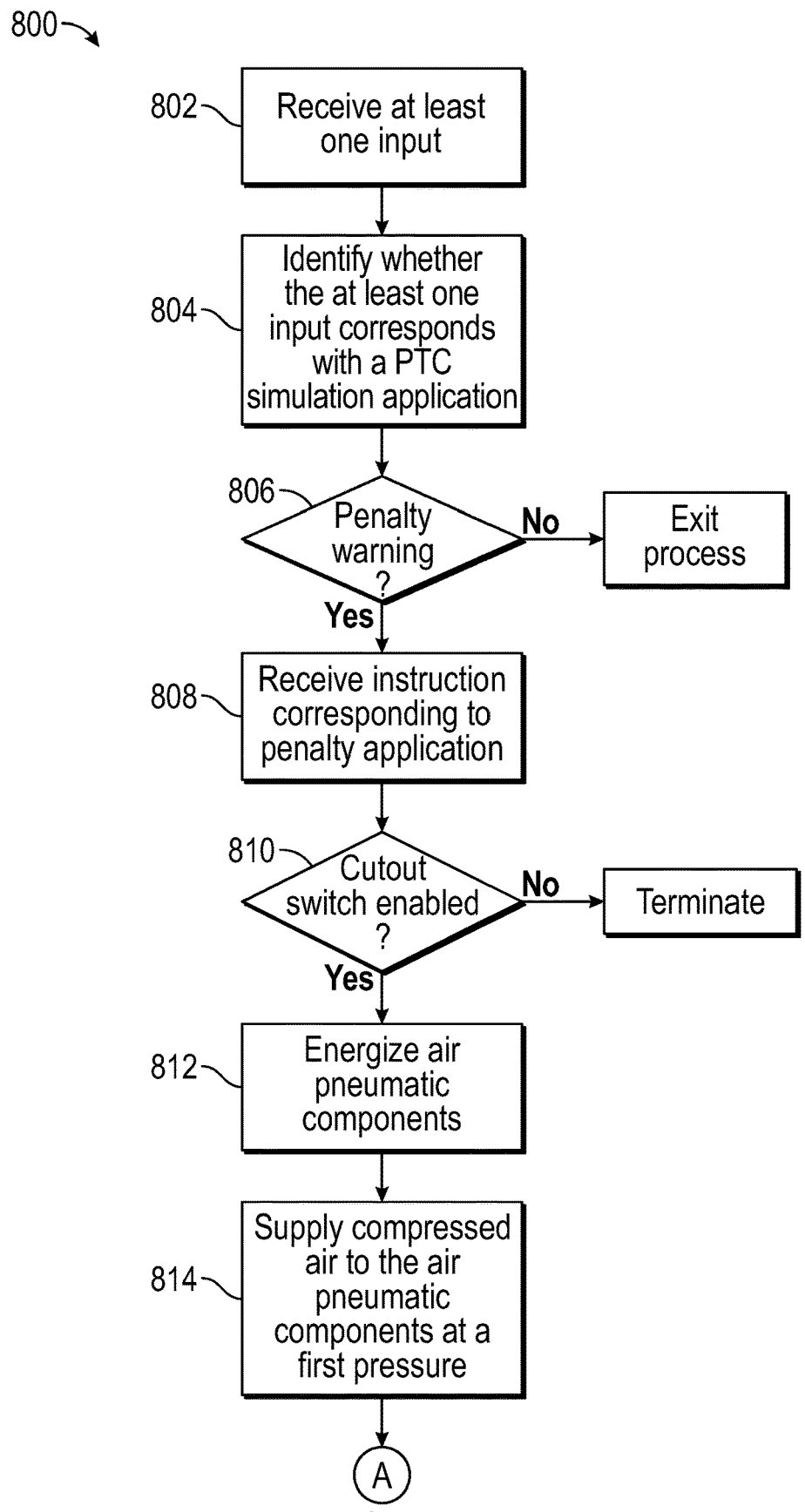
FIG. 8A illustrates a flowchart exemplifying a penalty application control logic, in accordance with one or more embodiments of the present disclosure.
Figure 8B:
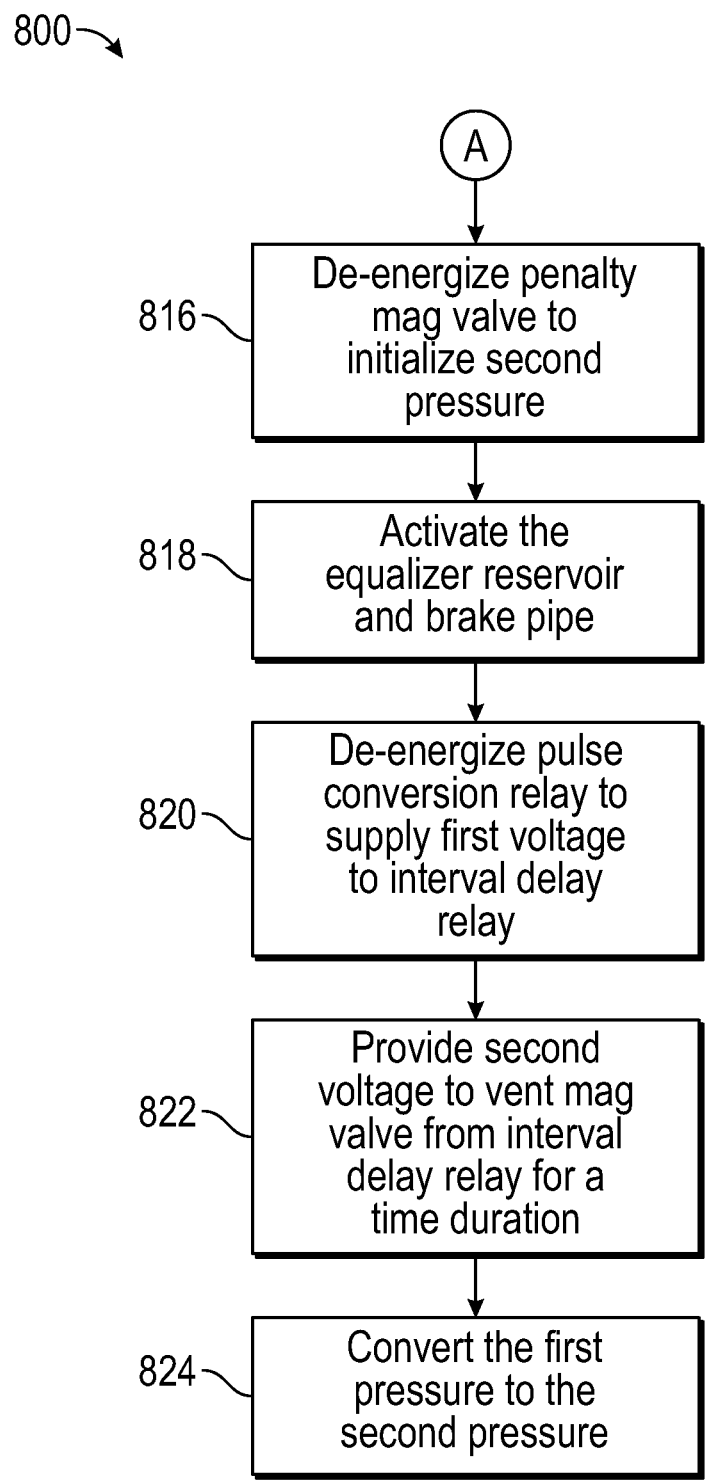
FIG. 8B illustrates a flowchart exemplifying a penalty application control logic, in accordance with one or more embodiments of the present disclosure.

FIG. 8A-B illustrate a flowchart exemplifying a penalty application control logic 800, in accordance with one or more embodiments of the present disclosure. The penalty application control logic 800 can be implemented as an algorithm on a TMC 104, a machine learning module, a client, a database, or other suitable system. Additionally, the penalty application control logic 800 can implement or incorporate one or more features of the PTC simulation system 200, including the display management system 202, communication system 204, locomotive control stand system 206, and simulation system 208. The penalty application control logic 800 can be achieved with software, hardware, firmware, assembly language, machine instructions, an API, a network connection, a network transfer protocol, HTML, DHTML, JavaScript, Dojo, Ruby, Rails, other suitable applications, or a suitable combination thereof.

The penalty application control logic 800 can leverage the ability of a computer platform to spawn multiple processes and threads by processing data simultaneously. The speed and efficiency of the penalty application control logic 800 can be greatly improved by instantiating more than one process to implement data lifecycle management. However, one skilled in the art of programming will appreciate that use of a single processing thread may also be utilized and is within the scope of the present disclosure.

In one embodiment, commands or data can be received via user input generated on a display or client, such as a screen tap, swipe, mouse click, key press, voice command, or other suitable mechanism. In another embodiment, the inspection commands or data can include inspection data having one or more fields, parameters, characteristics, or metadata, related to an inspection. The penalty application control logic 800 then proceeds to step 802.

At step 802, in an embodiment, the control logic 800 can receive at least one input. For example, the at least one input can correspond to a train penalty condition. In another example, the train penalty condition can correspond to a PTC application for simulation purposes. The control logic 800 proceeds to step 804.

At step 804, in an embodiment, the control logic 800 can identify whether the at least one input corresponds with a PTC simulation application. For example, the at least one input can include penalty information, emergency information, and horn information. In an example, the control logic 800 can receive the at least one input from a computer, such as the TMC 104. The control logic 800 proceeds with step 806.

At step 806, in an embodiment, the control logic 800 can determine whether the at least one input is a penalty warning. For example, the penalty warning corresponds with the PTC simulation application. If the at least one input is the penalty warning, the control logic 800 proceeds to step 808. If the at least one input is not the penalty warning, the control logic 800 proceeds to exit the process.

At step 808, in an embodiment, the control logic 800 can receive an instruction corresponding to the penalty warning. For example, the instruction can include information about the control logic 800 taking an action corresponding to the PTC simulation application. In an example, the instruction can include the action corresponding to the penalty warning. For example, the instruction can instruct an air pneumatic system to activate. The control logic 800 proceeds with step 810.

At step 810, in an embodiment, the control logic 800 can determine whether a cutout switch is closed. For example, the cutout switch can indicate whether a circuit driving the penalty application is active. In an example, the cutout switch can be closed when no errors exist corresponding to the PTC simulation. If the cutout switch is closed, the control logic 800 proceeds with step 812. If the cutout switch is open, the control logic 800 proceeds to terminate the process.

At step 812, in an embodiment, the control logic 800 can energize air pneumatic components. For example, the air pneumatic components can include a pulse conversion relay, a penalty magnetic valve, an interval delay relay, and a vent magnetic valve. In another example, the control logic 800 generate electrical signals to energize the air pneumatic components. The control logic 800 then proceeds to step 814.

At step 814, in an embodiment, the control logic 800 can supply compressed air to the air pneumatic components at a first pressure. For example, the control logic 800 can supply the compressed air to the air pneumatic components at the first pressure for a penalty period. In an example, the air pneumatic components can include one or more pressure transducers. In an example, the one or more pressure transducers can include an equalizer reservoir pressure transducer and a brake pipe transducer. In another example, the first pressure can be 90 psi. In another example, the penalty period can correspond to a service rate to safely alter compressed air pressure. The control logic 800 the proceeds to step 816.

At step 816, in an embodiment, the control logic 800 can deenergize the penalty magnetic valve to initialize a second pressure. For example, the second pressure can be 58 psi. In another example, the control logic 800 can terminate an electrical signal to deenergize the penalty magnetic valve. The control logic 800 the proceeds to step 818.

At step 818, in an embodiment, the control logic 800 can activate the equalizer reservoir pressure transducer and the brake pipe transducer. For example, the control logic 800 can generate an electrical signal to activate the equalizer reservoir pressure transducer and the brake pipe transducer. The control logic 800 the proceeds to step 820.

At step 820, in an embodiment, the control logic 800 can deenergize a pulse conversion relay to supply a first voltage to an interval delay relay. For example, the control logic 800 can terminate the electrical signal to the pulse conversion relay to deenergize. In another example, the first voltage can be 74 volts. The control logic 800 the proceeds to step 822.

At step 822, in an embodiment, the control logic 800 can provide a second voltage from the interval delay relay to the vent magnetic valve for a time duration. For example, the control logic 800 can control a signal from the interval delay relay to the vent magnetic valve for the time duration. In an example, the time duration can be 7 seconds. In another example, the second voltage can be 74 volts. The control logic 800 the proceeds to step 824.

At step 824, in an embodiment, the control logic 800 can convert the first pressure to the second pressure. For example, convert the first pressure to the second pressure to simulate a train penalty condition. In an example, the control logic 800 can control the air pneumatic components to reduce the first pressure to the second pressure at the service rate. For example, the service rate can correspond with a pressure change rate from the first pressure to the second pressure based on various mechanical factors.

The present disclosure achieves at least the following advantages:

1. simulates events of a PTC system without a locomotive;
2. controls electrical and mechanical components corresponding to similar components found on a locomotive to increase efficiency of training locomotive engineers and conductors;
3. enables simulation of events related to the PTC system in an accurate manner including a penalty application, an emergency application, and a horn application; and
4. optimizes training of locomotive engineers and conductors in a simulated environment to ensure focus on practical safety applications.

Persons skilled in the art will readily understand that these advantages (as well as the advantages indicated in the disclosure) and objectives of this system would not be possible without the particular combination of computer hardware and other structural components and mechanisms assembled in this inventive system and described herein. The algorithms, methods, and processes disclosed herein improve and transform any general-purpose computer or processor disclosed in this specification into a special purpose computer programmed to perform the disclosed algorithms, methods, and processes. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A system for simulating a penalty condition in a positive train control (PTC) system, comprising:
   an internal delay relay operably coupled to a PTC terminal board;
   a pulse conversion relay operably coupled to the internal delay relay and the PTC terminal board;
   an air compressor operably coupled to the pulse conversion relay;
   a penalty magnetic valve operably coupled to the air compressor;
   at least one brake pipe pressure transducer operably coupled to the penalty magnetic valve;
   a brake cylinder pressure transducer operably coupled to the penalty magnetic valve;
   a vent magnetic valve operably coupled to the penalty magnetic valve and the internal delay relay;
   wherein the system controls compressed air applied to the at least one brake pipe pressure transducer and the brake cylinder pressure transducer.

2. The system of claim 1, wherein the system further comprises:
   an equalizing reservoir pressure transducer operably coupled to the penalty magnetic valve; and
   a reservoir operably coupled to the penalty magnetic valve and an emergency magnetic valve.

3. The system of claim 2, wherein the penalty magnetic valve provides compressed air to the equalizer reservoir and the at least one brake pipe.

4. The system of claim 3, wherein the compressed air is 90 psi when the penalty magnetic valve is active, and wherein the compressed air is 58 psi when the penalty magnetic valve is inactive.

5. The system of claim 2, wherein the emergency magnetic valve includes an exhaust.

6. The system of claim 1, wherein the vent magnetic valve includes a choke.

7. The system of claim 1, wherein the air compressor provides compressed air to the brake cylinder.

8. The system of claim 7, wherein the compressed air is 72 pounds per square inch (psi).

* * * * *